3,718,445
FLAMMABLE COMPOSITION COMPRISING A
GELLED HYDROCARBON
Howard Julian Troffkin, Arlington, Va., and Vernon Paul Wystrach, Noroton Heights, Conn., assignors to the United States of America as represented by the Secretary of the Army
No Drawing. Filed Dec. 23, 1966, Ser. No. 605,149
Int. Cl. C10l 7/02
U.S. Cl. 44—7 C
7 Claims

ABSTRACT OF THE DISCLOSURE

The invention relates to a cross-linkable, flammable composition of matter comprising a hydrocarbon fuel, a butadiene polymer containing 2 to 4 free carboxyl groups and 1,3,5-hexahydroaziridinylpropionyl-s-triazine.

---

This invention relates to a novel composition of matter. More specifically, this invention relates to cross linkable and cross-linked flammable composition of matter composed of gasoline, a butadiene polymer containing reactive carboxyl groups and a hydrocarbon-soluble, trifunctional aziridine.

The gelling of gasoline for purposes of preparing compositions which may be used in aerial and ground warfare has been known for many years. Among the materials which have been used to gel gasoline to produce such compositions are the aluminum salts of various carboxylic acids such as caprylic acid, naphthenic acid and the like. The resultant compositions, more familarly known as napalm thickened gasoline, or simply "napalm," possess excellent flaming ability but suffer from many drawbacks. Two of these drawbacks are the relative gel instability of the compositions and their affinity for water. That is to say, "napalm" is very unstable physically and therefore must be made near the site of its ultimate use and used thereafter within a short period of time. Furthermore, the gelling properties are affected by moisture to the extent that substantially water-free conditions must prevail during its production.

We have now found a novel system which may be cross-linked prior to its ultimate use and safely stored for long periods of time without suffering degradation of its useful visco-elastic properties. Furthermore, the compositions of the instant invention may be prepared under normal everyday atmospheric conditions. A further advantage is that the cross-linkable, or gellable, compositions of the instant invention may be charged into flame munition casings before they are ultimately gelled or cross-linked. In this way, munitions may be pre-filled and stored at a site removed from the point of use.

As mentioned above, the novel compositions of the instant invention are composed of three major components.

The first component is a combustible hydrocarbon fuel such as kerosene, jet aircraft fuels such as JP-4, commercial or domestic fuel oil, gasoline and the like which may be present in amounts ranging from about 80% to about 98%, by weight, based on the total weight of the composition per se.

The second component is a butadiene polymer containing free carboxyl groups which function as cross-linking sites. These polymers are commercially available and are well known in the art of rocket propellant manufacture in the form of pre-polymers. Generally, they are low molecular weight butadiene polymers containing, as an optimum, 2–4 carboxyl groups per polymer chain. These materials range in molecular weight from about 1200 to 6000. They are syrup-like polymers having pendent or terminal carboxyl groups. The pre-polymers can also be saturated by hydrogenation before use. Those which are unsaturated have a more fluid or honey-like appearance than the stiffer saturated polymers. Another butadiene polymer, i.e. carboxy-terminated polybutadiene, may be prepared by polymerizing butadience in the presence of, e.g. sodium, under known conditions. The resultant intermediate product is sodium terminated butadiene, e.g.,

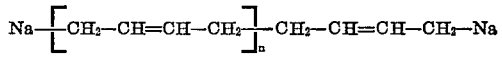

wherein $n$ is generally in the range of about 10 to 100. These sodium terminated polymers are then reacted with, e.g. excess carbon dioxide to produce the sodium carboxylate polymer, i.e.

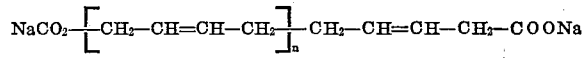

which is then acidulated to convert the sodium salt to the acid, thus

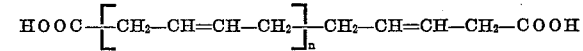

Catalytic hydrogenation can then be utilized to cause saturation of the available double bonds to produce various saturated polymers, as mentioned above.

Equally useful butadiene polymers containing free carboxyl groups as cross-linking sites can be prepared by copolymerizing a mixture of butadiene and an acid monomer, e.g. acrylic acid under conditions of a typical vinyl polymerization using a free radical initiator. Such a copolymer can be pictured by the idealized formula

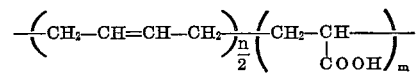

where $n$ is generally in the range of about 20 to 200 and $m$ is generally about 2–4. Although statistically the free carboxyl groups would be pendent anywhere along the chain, in some instances they may be at the chain ends. Such butadiene-acrylic acid copolymers can also be catalytically hydrogenated to the saturated forms.

The carboxyl containing butadiene polymers may be utilized in amounts ranging from about 2% to about 20%, by weight, based on the total weight of the resultant composition.

The third component of our novel cross-linkable compositions is a hydrocarbon-soluble, trifunctional aziridine. An example of such an aziridine includes 1,3,5-hexahydroaziridinylpropionyl-s-triazine, i.e.,

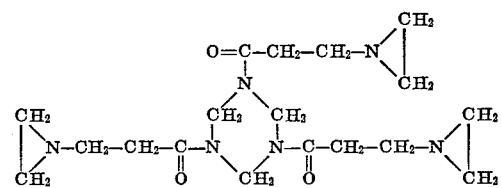

Alternatively, hydrocarbon-soluble trisepoxides can be used as cross-linking agents.

The aziridines and epoxides are also well known in the art as are their methods of preparation. They may be utilized in amounts ranging from about 0.1% to about 2.0%, by weight, based on the total weight of the resultant composition.

The novel cross-linkable compositions of the instant invention may be prepared by merely dissolving the carboxy modified butadiene polymer in the hydrocarbon fuel and adding the cross-linking agent when dissolution is complete. The resultant composition may be cross-linked by merely storing it at room temperature for several days.

Slight heating, however, causes the composition to cross-link at a faster rate.

As discussed above, the novel compositions of the instant invention are fuel gels or flame agents which may be used over a wide spectrum of flame weapon applications including flame throwers, shells and grenades.

The following examples are set forth for purposes of illustration only and are not to be construed as limitations on the instant invention except as set forth in the appended claims. App parts and percentages are by weight unless otherwise specified.

EXAMPLE 1

To 16 parts of gasoline are added 4 parts of a commercially available carboxy-terminated polybutadiene having an average molecular of 5500 and a carboxyl content of 1.66%. After dissolution of the pre-polymer is complete a dark orange, low viscous solution results. To this solution are added 2 parts of 1,3,5-hexahydroaziridinyl-propionyl-s-triazine. After 31 days a highly viscoelastic gel is recovered. The gel burns with a yellowish colored, smoky flame.

EXAMPLE 2

Following the procedure of Example 1, except that the butadiene polymer has been saturated by catalytic hydrogenation, a similar gelled composition is produced. This composition also burns readily with a smoky flame.

EXAMPLE 3

The procedure of Example 1 was again followed except that a copolymer of butadiene and acrylic acid (95/5) was substituted for the polymer used therein. A gelled composition having similar burning characteristics was recovered.

EXAMPLES 4-6

Gelled compositions similar to that produced in Example 1 were prepared utilizing JP-4 jet fuel, a commercially available fuel oil and kerosene in place of the gasoline specified therein.

TABLE I

| Ex. | Compound | Result |
|---|---|---|
| 7 | Triethylene melamine | Did not get. |
| 8 | Nitrilo[tris(ethyl α-propyleneimino)propionate] | Do. |
| 9 | Methylaziridinylphosphine oxide | Do. |
| 10 | Hexahydromethylaziridinylpropionyl-s-triazine | Do. |
| 11 | Tripropylene melamine | Do. |
| 12 | Tributylene melamine | Do. |

The comparative results of Table I were achieved utilizing the procedure of Example 1 with the substitution of various other materials for the aziridine compound.

We claim:

1. A cross-linkable, flammable composition of matter comprising from about 80% to about 98% of a combustible, hydrocarbon fuel, from about 2.0% to about 20% of a hydrocarbon-soluble butadiene polymer containing from about 2 to about 4 free carboxyl groups per polymer chain and having a molecular weight of from about 1200 to about 6000 and from about 0.1% to about 2.0% of 1,3,5-hexahydroaziridinylpropionyl-s-triazine.

2. The composition of claim 1 in cross-linked form.

3. The composition of claim 1 wherein said polymer is a carboxyl terminated polybutadiene.

4. The composition of claim 3 in cross-linked form.

5. A composition according to claim 1 wherein said fuel is gasoline.

6. A composition according to claim 1 wherein said fuel is gasoline, said polymer is a carboxyl terminated polybutadiene and said aziridine is 1,3,5-hexahydroaziridinylpropionyl-s-triazine.

7. The composition of claim 6 in cross-linked form.

References Cited

UNITED STATES PATENTS

| 3,087,844 | 4/1963 | Hudson et al. | 149—19 |
| 3,147,161 | 9/1964 | Abere et al. | 149—19 |
| 3,180,843 | 4/1965 | Dickerson | 260—78.5 X |

LELAND A. SABASTIAN, Primary Examiner

U.S. Cl. X.R.

44—7 D; 260—32.6 R, 33.6, 78.5 T